United States Patent [19]

Block

[11] Patent Number: 4,846,074
[45] Date of Patent: Jul. 11, 1989

[54] CONVEYOR PALLET CONSTRUCTION
[75] Inventor: Bruce E. Block, Caledonia, Ill.
[73] Assignee: Rockford Automation, Rockford, Ill.
[21] Appl. No.: 171,906
[22] Filed: Mar. 22, 1988
[51] Int. Cl.[4] ............................................. B31B 13/00
[52] U.S. Cl. .................................................... 104/166
[58] Field of Search ............... 104/165, 166, 189, 162, 104/163, 96, 99, 48, 50; 198/465.2

[56] References Cited

U.S. PATENT DOCUMENTS

| | | | |
|---|---|---|---|
| 418,856 | 1/1890 | Storey | 104/166 |
| 761,610 | 5/1904 | Riblet | 104/165 |
| 993,261 | 5/1911 | Lowell | 246/183 |
| 1,122,643 | 12/1914 | Rice et al. | 246/182 R |
| 1,171,112 | 3/1915 | Frees et al. | 246/182 R |
| 2,997,003 | 8/1961 | Thompson | 104/93 |
| 3,118,393 | 1/1964 | Ohlin | 104/166 |
| 3,164,104 | 1/1965 | Hunt et al. | 104/166 |
| 3,291,070 | 12/1966 | Bradt et al. | 104/88 |
| 3,818,837 | 6/1974 | Jacoby et al. | 104/166 |
| 3,842,752 | 10/1974 | Harwick | 104/166 |
| 3,858,707 | 1/1975 | Block et al. | 104/166 X |
| 3,866,537 | 2/1975 | Minkwitz | 104/166 X |
| 4,462,313 | 7/1984 | Sleep et al. | 104/166 X |
| 4,498,397 | 2/1985 | Fuchs et al. | 104/166 X |

Primary Examiner—Johnny D. Cherry
Assistant Examiner—Joseph D. Pape
Attorney, Agent, or Firm—Allegretti & Witcoff, Ltd.

[57] ABSTRACT

An improved moving work pallet construction includes a cantilever pallet supported on a single track by a wheel or roller. A drive shaft parallel to the track serves to counterbalance the weight of the pallet and also cooperates with a drive wheel on the pallet construction that is selectively positionable between a rest and a drive position due to coaction with a stop member projecting from the next adjacent pallet or mounted at each work station. In this manner, the cantilevered pallet construction can accumulate on the track as well as stop at a work station where it is possible to lock it into position at the work station.

10 Claims, 4 Drawing Sheets

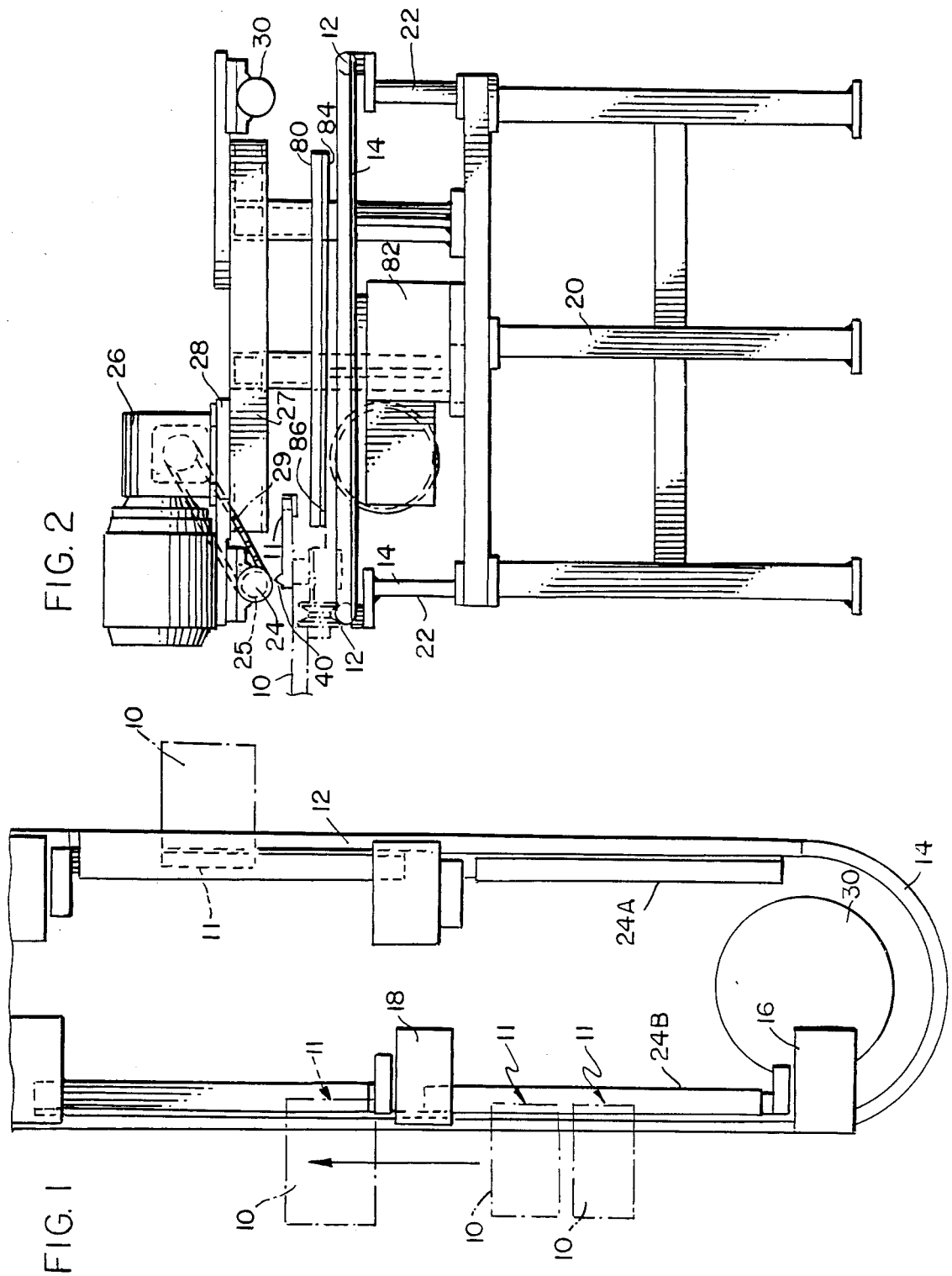

CONVEYOR PALLET CONSTRUCTION

BACKGROUND OF THE INVENTION

This invention relates to an improved conveyor pallet construction which is especially useful for multiple work station, assembly lines wherein a separate operation is performed at each of the stations, and further wherein the operation performed at each separate station requires that the pallet construction be fixed or stationary for a discrete period of time at that station.

Jacoby et al in U.S. Pat. No. 3,818,837 discloses a vehicle and track system which is especially useful for manufacturing processes that require a series of separate work stations along a conveyor path. The Jacoby patent teaches a mechanism which provides for transfer of pallets between the separate work stations and also includes a means which permits the pallets to accumulate, in line behind a pallet retained at a work station while a manufacturing operation is performed at that station.

Specifically, Jacoby et al teaches a mechanism which utilizes a continuously operating, rotating longitudinal shaft that cooperates with a drive wheel mounted on a movable work pallet. The pallet is supported on guide rails by rollers and moves along the guide rails in response to motive force received from the rotating shaft. The orientation of the drive wheel mounted on the pallet relative to the longitudinal drive shaft dictates the drive force imparted by the drive shaft to the work pallet. A control arm projects from the drive wheel and is responsive to the position of one work pallet with respect to the next adjacent work pallets. Thus, the proximity of one work pallet to the next will control the drive force imparted to the next adjacent pallet. In this manner when pallets approach each other closely, the drive force thereon substantially terminates because the control arm causes the drive wheel to disengage from the motive force of the drive shaft.

While the aforesaid construction described in the Jacoby et al patent is extremely useful, there remain some unresolved problems associated with such a construction. For example, work pallets have heretofore been supported on a pair of parallel tracks with the drive shaft therebetween. The drive shaft may be positioned above or below the pallet. Access to the pallet, however, may be restricted by this arrangement. Thus, a work station operation which requires access to both the top and bottom side of the pallet simultaneously was not readily possible with the prior art construction.

The present invention overcomes such difficulty by providing a cantilever supported work pallet. Thus, an operation may be performed on the work pallet on both the bottom or the top of the work pallet. Uniquely shaped items may be supported by such a work pallet. Access to the item being processed on the work pallet is much easier.

SUMMARY OF THE INVENTION

In a principal aspect, the present invention comprises an improved moving pallet construction and more particularly a moving pallet construction which provides for a cantilevered work pallet supported on a track defining a pathway between at least two work stations. The cantilevered pallet construction has a distal end on one side of the track and, on the opposite side of the track, a drive wheel means that cooperates with a rotating shaft means. The drive wheel means is selectively positionable between a drive and a rest position about an axis which is generally transverse to the longitudinal axis of the shaft. Various types of stops may be used to engage a control arm associated with the drive wheel means thereby controlling the orientation of the drive wheel relative to the shaft and causing the pallet construction to stop movement or commence movement. For example, stop means may be associated with a projecting arm from the next adjacent work pallet construction on the track. Also, stop means may be associated with a work station along the track. Finally, the construction also includes a means for pivoting the pallet into a locked position at a work station.

Thus, it is an object of the invention to provide an improved work pallet construction which permits accumulation of similar work pallet constructions along a track.

A further object of the invention is to provide a work pallet construction which includes a cantilevered work pallet.

Another object of the invention is to provide a work pallet construction which is responsive to stop means associated with adjacent pallets as well as a stop means associated with a work station.

Yet a further object of the invention is to provide an improved work pallet construction of simple and economic construction.

A further object of the invention is to provide a work pallet construction having a work pallet which projects in cantilever fashion and may be pivoted and locked into place at a work station.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a top plan view of a multiple work station assembly employing the improved pallet construction of the present invention;

FIG. 2 is an end view of assembly of FIG. 1;

DESCRIPTION OF THE PREFERRED EMBODIMENT

Figure 3:
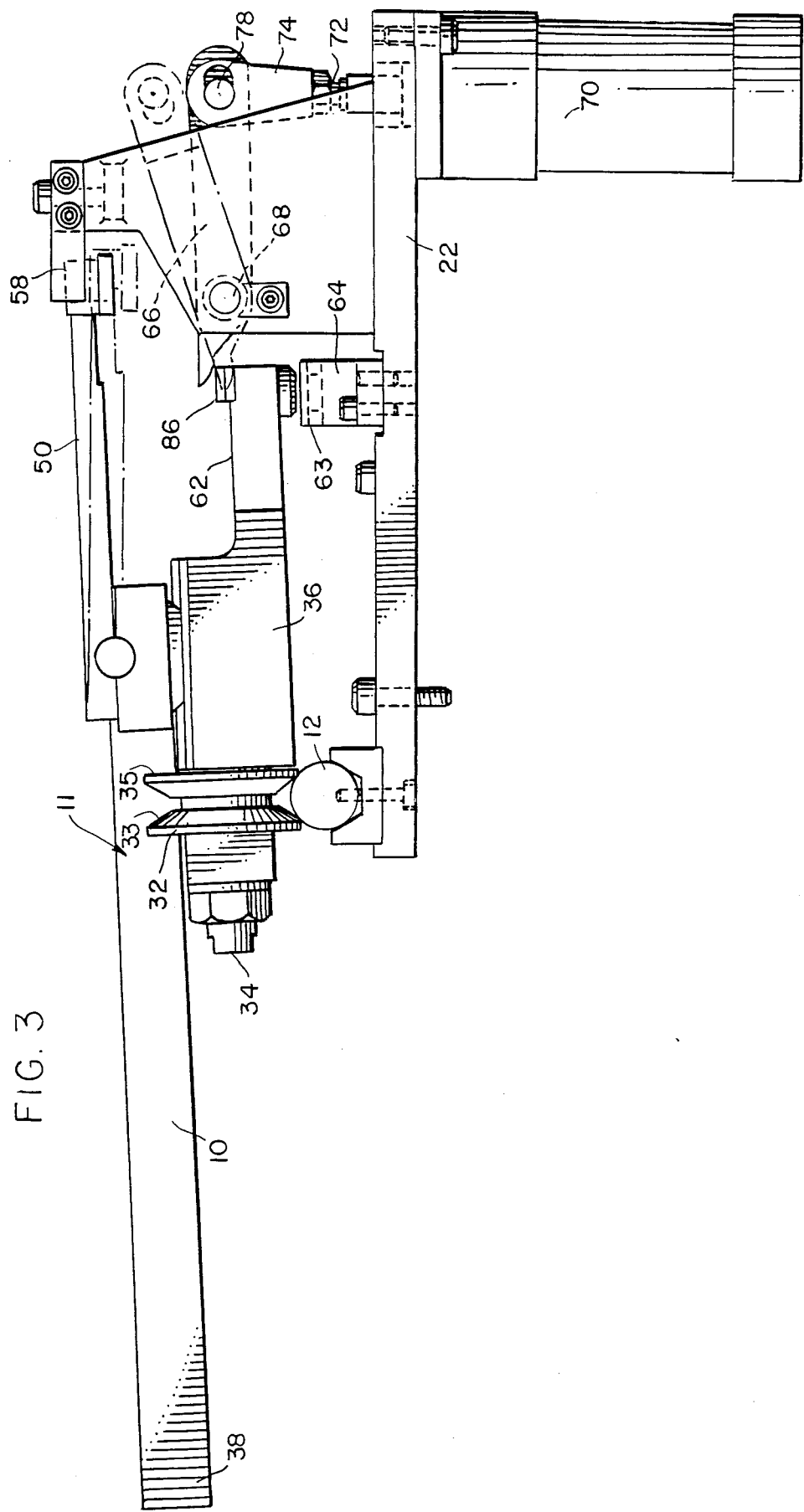
FIG. 3 is an enlarged end view of the cantilever work pallet construction of the present invention.

Referring first to FIG. 1, the improved moving pallet construction 11 of the present invention is typically incorporated as part of a conveyor having multiple work stations and is useful, for example, in an assembly plant for appliances or the like. At each of the multiple work stations, a particular assembly operation is performed with respect to an item placed upon or supported by a work pallet 10 associated with construction 11

In FIG. 1 there is illustrated a portion of such an assembly line conveyor wherein each work pallet 10 of a work pallet construction 11 moves in the direction indicated by the arrow along a track 12. The track 12 is typically straight, however, an arcuate section 14 of track 12 permits curvature of the assembly line and incorporation thereof in a more restricted space. In practice, a particular operation is performed on an item supported by the pallet 10 when the pallet 10 is positioned and fixed at a particular work station, for example, work station 16 shown schematically in FIG. 1. The pallet 10 will be released after the operation is performed to move to the next work station, for example, work station 18 also shown schematically in FIG. 1.

A number of pallets 10 may be positioned on track 12 between each of the work stations 16 and 18, for example. Thus, the pallets 10 are each part of a total assembly and are driven to permit movement between work stations 16 and 18 as the operation performed at each of the separate work stations 16, 18 is completed and further to permit accumulation of the pallets 10 between stations when a single pallet 10 is fixed at a station. Thus, the present invention provides a mechanism for movement of pallets 10 between work stations, for accumulation of pallets 10 between work stations, for stopping a pallet 10 at a work station, for supporting a pallet 10 in a cantilever fashion at all times to provide improved access to the operation being performed thereon, and for locking a pallet 10 in position at a work station.

FIG. 2 illustrates a front elevation of the construction depicted in FIG. 1. The entire conveyor assembly is supported by a stand 20 comprised of vertical and horizontal cross members and plates. The rail 12 typically has a cylindrical cross section and is supported on a framework 22 erected on the stand 20. The moving pallet platform construction 11 at all times rides on the single rail 12 supported by the framework 22.

The initial description will focus on the moving pallet platform construction 11 as it moves along the straight sections of the rail 12. FIG. 2 depicts the moving pallet platform construction 11 with a cantilever platform or pallet 10 as it is supported on such a straight section of track 12. Motive or tractive force is imparted to the moving pallet platform construction 11 by means of a cylindrical drive shaft 24 driven by a motor 26 about the longitudinal axis 30 (see FIG. 5) of shaft 24. The motor 26, of course, is mounted on a platform 28 supported by a bracket assembly 27 on the stand 20. The shaft 24 is appropriately mounted on bearings 25 or journaled on bearings 25 also supported on assembly 27 over track 12 and offset from track 12 as depicted in FIG. 2. Motor 26 through a pulley 29 rotationally drives shaft 24 about the longitudinal axis 30 thereof.

The shaft 24 cooperates with a drive wheel 40 associated with the platform construction 11, as will be described in greater detail with respect to subsequent figures, to provide motive force to the moving pallet platform construction 11. The orientation of the drive wheel 40 with respect to the axis 30 determines the amount of tractive force imparted to the platform construction 11 in accord with the disclosure of the Jacoby et al patent referenced previously.

Figure 4:
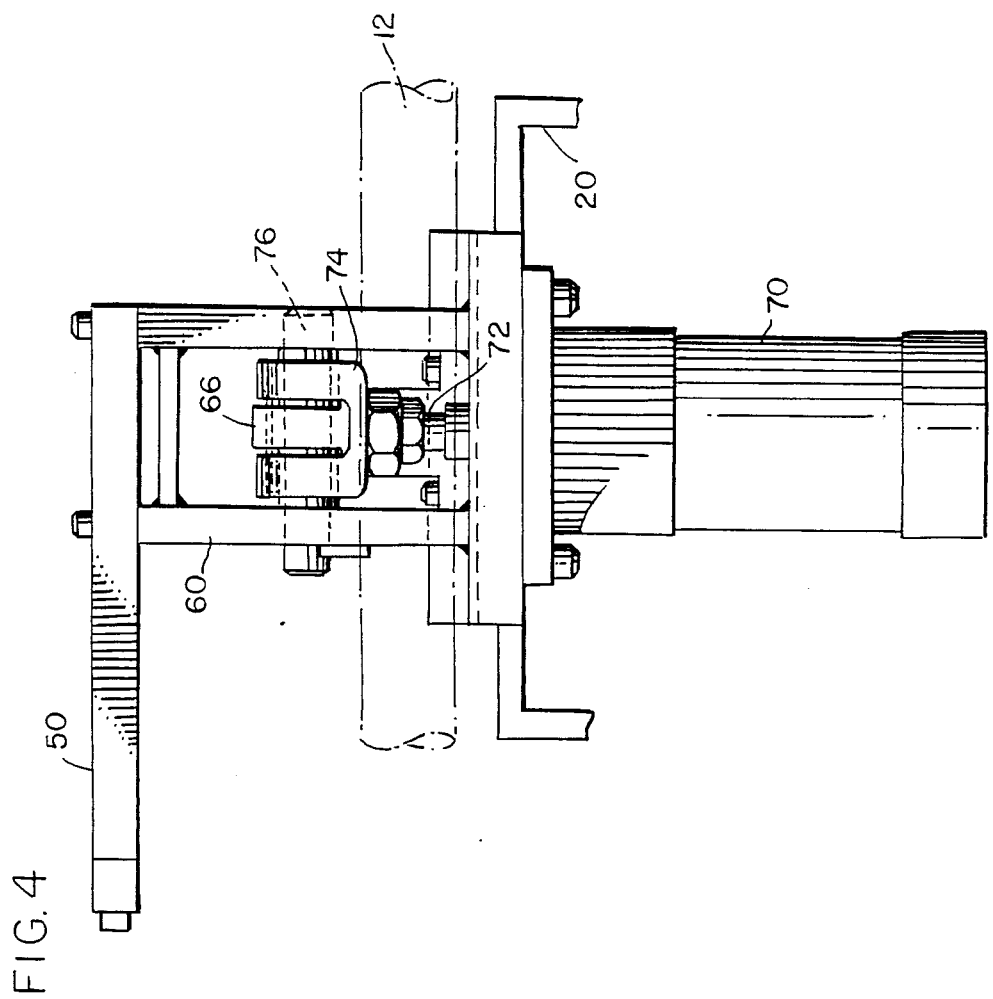
FIG. 4 is a right side view of the construction shown in FIG. 3.
Figure 5:
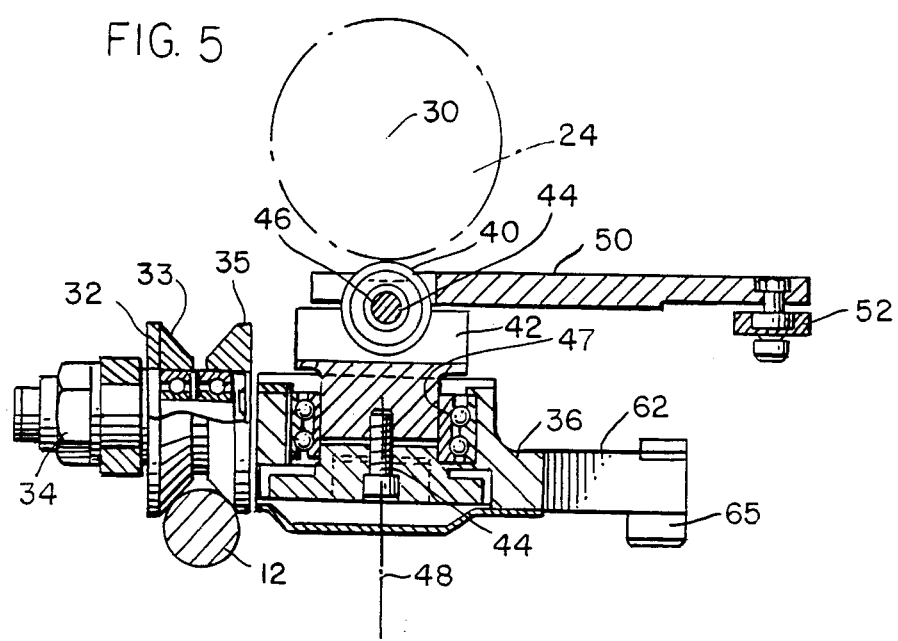
FIG. 5 is a sectional view of the pallet construction shown in FIG. 3.

Specifically, as depicted in FIG. 2 as well as in FIGS. 3, 4 and 5, the platform 10 is supported by rollers 32 mounted on an axle 34. Axle 34 is attached to the platform 10 by a bracket 36. The rollers 32 are preferably defined by spaced, opposed frustoconical sections 33, 35 which fit over and roll upon the outer cylindrical surface of the track 12. As shown in the subsequent figures, a plurality of rollers 32 are attached to platform 10 by means of the bracket 36 to support the platform 10 on track 12.

The shaft 24 is positioned generally parallel to track 12 and above track 12. Shaft 24 is on the opposite side of track 12 relative to distal end 38 of the platform 10. The shaft 24 cooperatively engages with the drive wheel 40 which projects from a housing 42, in which wheel 40 is mounted, for rotation about a lug or pin 44 having a rotation axis 46.

The housing 42, in turn, is pivotally mounted in a counterbore opening 47 of bracket 36 for rotation about a vertical axis 48 as depicted in FIG. 5. The housing 42 is thus journaled in the bracket 36.

The drive wheel 40 impinges or rides against the lower side of rotating shaft 24 and thereby serves to support the platform construction 11. Thus, any object placed on the platform 10 of the platform construction 11 is physically supported by the shaft 24. The distance between axis 30 of shaft 24 and the longitudinal center line of track 12 thus defines a lever arm for support of platform 10.

Further, as the shaft 24 is rotatably driven by motor 26 against the drive wheel 40, and depending upon the orientation of the axis of rotation 46 of the drive wheel 40 with respect to the axis 30, the shaft 24 may impart motion to construction 11 in the longitudinal direction of shaft 24. In other words, shaft 24 drives construction 11 along the axis 30 of the shaft 24.

Figure 6:
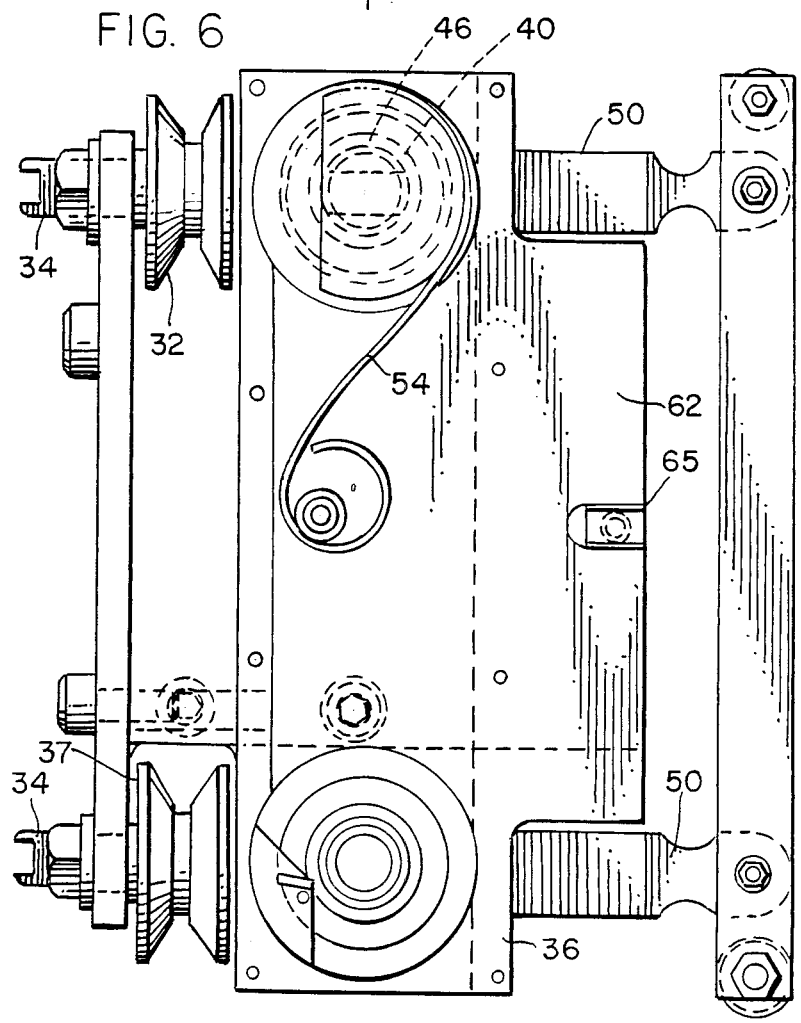
FIG. 6 is a bottom plan view of the construction shown in FIG. 3.

Orientation of wheel 40 is controlled by a control arm 50. The control arm 50 extends from the housing 42 generally perpendicular to axis 46. The control arm 50 includes a distal end with a roller 52 thereon for cooperation with some type of stop means. Typically, as shown in FIG. 6, the housing 42 and thus the control arm 50 are biased by a spring 54 so that axis 46 is skewed with respect to axis 30. When axis 46 is skewed relative to axis 30, the rotating shaft 24 imparts motive force through the drive wheel 40 to the platform construction 11.

However, when the control arm 50 and more particularly the stop roller 52 engages against a stop to thereby orient the axis 46 generally parallel with the axis 30, motive or traction force from shaft 24 to construction 11 is terminated. Motion of the platform construction 11 then ceases.

Figure 7:
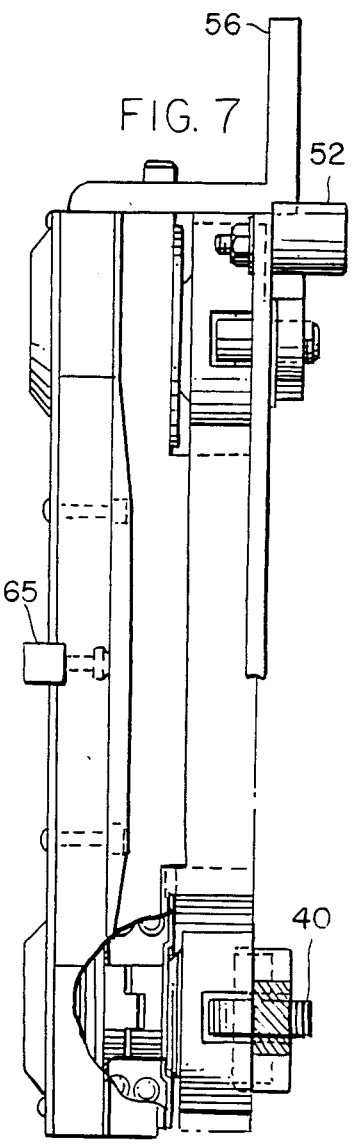
FIG. 7 is a side view of the construction shown in FIG. 6.

The control arm 50 may be moved against the biasing force of spring 54 by engaging either a stop arm, such as stop arm 56 in FIG. 7, of the next adjacent platform construction 11. Alternatively, the roller 52 may engage against a fixed stop 58 supported on the stand 20 as shown in FIGS. 3 and 4. Typically, as shown in FIG. 4, the stop 58 is attached by a bracket 60 to the support stand 20 at the position of a work station 16. Thus, when the platform construction 11 approaches the work station 16 and is aligned properly with respect to the work station 16, the stop 58 will engage roller 52 causing arm 50 to rotate against biasing force of spring 54. The wheel 40, and more particularly axis 46, aligns with axis 30 of shaft 24 causing tractive force to cease being imparted to the platform construction 11. That is, the control arm 50 is oriented so as to effectively disengage the motive force of shaft 24 from wheel 40.

Referring to FIG. 3, a mechanism is also provided to disengage the stop roller 52 from the stop 58 at a work station. Specifically, bracket 36 includes a locator plate or flange extension 62. When the platform construction 11 is positioned at the work station 16, the flange 62 is also aligned over a work position block 64 on framework 22. A drive arm 66, which is pivotally mounted on a shaft 68 supported on framework 22 may then be driven by a hydraulic cylinder 70 which extends a rod 72 connected to a yoke 74 attached to the end of arm 66. The yoke 74 cooperates with a pin 76 at the end of the arm 66. When the piston 70 is actuated, the drive arm 66 will pivot and engage the top of the flange 62 driving a key block 65 downwardly into a slot or key 63 in the work station block 64. This simultaneously causes the entire platform construction 11 to pivot about the track 12 on the wheels 32.

As construction 11 pivots, the stop roller 52 moves downwardly and is released from the brake 58 by moving the construction to the position shown in phantom in FIG. 3. When the roller 52 is released from brake 58, the biasing spring 54 causes the arm 50 to move away from the position depicted in FIG. 5 thereby positioning wheel 40 for maximum tractive force. However, since the platform construction 10 has been pivoted downward, the wheel 40 does not engage the rotating shaft 24. Consequently the platform construction 11 is locked in position at the work station until the piston 70 is actuated to release the platform construction 11 upward and thereby permit the shaft 24 to again engage the drive wheel 40.

In sum, the platform construction 11 is moved to a work station where it is stopped because of the coaction of stop 58 and roller 52. It then moves into a locked position due to the action of the piston 70 and pivoting of the key block 65 of flange 62 into key 61 of block 64. Upon release of the flange 62 from block 64, motive force is again imparted to the wheel 40 by shaft 24 since wheel 40 has been reoriented due to the operation of the spring 54. The platform construction 11 will then move from work station to work station for undertaking of operations to be performed at each of the said stations.

As shown in FIG. 1, there is an discontinuity or gap between segments of the shaft 24. Thus, referring to FIG. 1, a first shaft section 24(A) is not directly connected to a second shaft section 24(B). Note, however, that the track 12 is continuous and includes an arcuate section 14. Transport of the platform construction 11 between the intermittent shaft sections 24(A) and 24(B) is accomplished by means of a horizontal, circular drive plate 80 shown in FIGS. 1 and 2 which is driven in a clockwise direction by a motor 82. The plate 80 includes a friction strip 84 along its lower surface which engages against an appropriate cooperating friction strip 86 on the flange 62 depicted in FIG. 3 as the platform construction 11 is positioned appropriately relative to the plate 80. Thus, as the plate 80 rotates and the friction strips 84 and 86 come into contact, the platform construction 11 is carried on the track section 14. The plate 80 serves to not only transport, but also support the cantilever platform construction 11 on curved section 14 of track 12.

Various alterations may be made to the invention. For example, the cross-sectional configuration of track 12 may be altered. Two parallel and closely positioned tracks 12 may be used. The pallet or platform 10 may be varied in size and orientation.

Thus, while there has been set forth a preferred embodiment of the invention, it is to be understood that the invention is to be limited only by the following claims and their equivalents.

What is claimed is:

1. An improved moving pallet platform construction comprising, in combination:

(a) a track defining a pathway between at least two spaced work stations;
(b) a generally horizontal work pallet having an unsupported distal side, said pallet being supported as a cantilever;
(c) roller means attached to the work pallet for rolling support of the pallet on the track whereby the pallet is movable between the work stations along the track;
(d) a rotating drive shaft having a longitudinal axis generally parallel to the track and extending between the work stations;
(e) drive wheel means on the pallet including a drive wheel that is selectively positionable about an axis generally transverse to the longitudinal axis of the shaft, said drive wheel being in contact with the surface of the shaft and imparting a longitudinal direction and drive force to the pallet from the rotating shaft whenever the rotation axis of the drive wheel and the rotation axis of the shaft are not parallel, said drive wheel being spaced from the roller means, a sufficient lever arm distance in the direction opposite the distal end of the pallet to provide cantilever support for the pallet; and
(f) a control arm connected to the drive wheel and projecting forwardly for engagement with stop means that effects oscillation of the control arm and the drive wheel between a drive position with respect to the rotating drive shaft and a rest position with respect to the rotating drive shaft.

2. The improved construction of claim 1 including a next adjacent work pallet supported for movement on the drive shaft and wherein the stop means comprises a lever arm projecting from the next adjacent pallet for engagement with the control arm whenever the adjacent and the work pallet approach within a predetermined distance of each other.

3. The construction of claim 1 including a support stand and wherein the stop means comprises an external lever arm supported on the stand at a fixed position relative to a defined work station whereby the extended lever arm at the work station engages the control arm to selectively position the drive wheel and terminate movement of the pallet to maintain residence of the pallet at the work station.

4. The improved construction of claim 3 including means at said work station for disengaging the stop means from the control arm.

5. The improved construction of claim 3 including means for pivoting the entire pallet on its track to thereby release the control from the stop arm and to simultaneously lock the pallet in a fixed position at a work station.

6. The improved construction of claim 1 including means for constantly biasing the control arm toward the drive position, said biasing means being supported by the work pallet.

7. The improved construction of claim 1 wherein the drive shaft is intermittent and further including means for supporting and transporting the work pallet between the intermittent sections of the draft shaft.

8. The improved construction of claim 7 wherein the work pallet includes a projecting support flange extending from the pallet opposite the direction of the distal end, said support flange engageable with a frame construction that provides cantilever support to the platform.

9. The improved construction of claim 8 wherein the frame construction includes means for moving the frame construction in the direction of the track between the intermittent sections of the drive shaft.

10. The improved construction of claim 9 wherein the frame construction and track are curved in the intermittent region between the drive shaft and define a generally circular segment, said frame construction comprising a circular member for engaging the flange and rotating therewith to impart movement of the work pallet.

* * * * *